(12) United States Patent
Filar et al.

(10) Patent No.: US 10,380,998 B2
(45) Date of Patent: Aug. 13, 2019

(54) VOICE AND TEXTUAL INTERFACE FOR CLOSED-DOMAIN ENVIRONMENT

(71) Applicant: Endgame, Inc., Arlington, VA (US)

(72) Inventors: Robert Filar, Alexandria, VA (US); Richard Seymour, Arlington, VA (US); Alexander Kahan, Arlington, VA (US)

(73) Assignee: Endgame, Inc., Arlington, VA (US)

(*) Notice: Subject to any disclaimer, the term of this patent is extended or adjusted under 35 U.S.C. 154(b) by 45 days.

(21) Appl. No.: 15/706,379

(22) Filed: Sep. 15, 2017

(65) Prior Publication Data

US 2019/0088254 A1 Mar. 21, 2019

(51) Int. Cl.
| | | |
|---|---|---|
| G10L 15/00 | (2013.01) |
| G10L 15/18 | (2013.01) |
| G10L 15/22 | (2006.01) |
| G10L 15/26 | (2006.01) |
| G06F 17/27 | (2006.01) |
| G10L 15/08 | (2006.01) |

(52) U.S. Cl.
CPC ........ G10L 15/1815 (2013.01); G06F 17/277 (2013.01); G06F 17/278 (2013.01); G06F 17/2785 (2013.01); G10L 15/22 (2013.01); G10L 15/265 (2013.01); G10L 2015/086 (2013.01); G10L 2015/223 (2013.01)

(58) Field of Classification Search
CPC ........ G06F 17/278; G10L 15/22; G10L 17/22
USPC ............................................................ 704/9
See application file for complete search history.

(56) References Cited

U.S. PATENT DOCUMENTS

| | | | |
|---|---|---|---|
| 10,073,673 B2* | 9/2018 | Brancovici | G06F 17/2785 |
| 10,114,975 B1* | 10/2018 | Sun | G06F 21/6245 |
| 2011/0225200 A1 | 9/2011 | Danis et al. | |
| 2012/0253793 A1* | 10/2012 | Ghannam | G06F 17/2785 704/9 |
| 2013/0332162 A1 | 12/2013 | Keen | |
| 2016/0041967 A1* | 2/2016 | Ghannam | G06F 17/2785 704/9 |
| 2016/0148116 A1 | 5/2016 | Bornea et al. | |
| 2018/0330729 A1* | 11/2018 | Golipour | G10L 15/22 |

* cited by examiner

*Primary Examiner* — Daniel Abebe
(74) *Attorney, Agent, or Firm* — DLA Piper LLP (US)

(57) ABSTRACT

An improved system and method is disclosed for receiving a spoken or written utterance, identifying and replacing certain words within the utterance with labels to generate a simplified text string representing the utterance, performing intent classification based on the simplified text string, and performing an action based on the intent classification and the original words that were replaced.

24 Claims, 14 Drawing Sheets

FIGURE 4A

Utterance
302

Show processes for 12341234123412341234 on Windows endpoints since Monday

FIGURE 4B

| Show | processes | for | 1234123412341234 | on | Windows | endpoints | since | Monday |

Tokenized Utterance
304

FIGURE 4D

| Show | processes | for | 1234123412341234 | on | Windows | endpoints | since | Monday |

Tokenized Utterance
304

FIGURE 4F

| Show | processes | for | ENT-MD5 | on | ENT-ENDPOINT | endpoints | ENT-DATE |

Tokenized Redacted Text
313

US 10,380,998 B2

VOICE AND TEXTUAL INTERFACE FOR CLOSED-DOMAIN ENVIRONMENT

FIELD OF THE DISCLOSURE

An improved system and method is disclosed for receiving a spoken or written utterance, identifying and replacing certain words within the utterance with labels to generate a simplified text string representing the utterance, performing intent classification based on the simplified text string, and performing an action based on the intent classification and the original words that were replaced.

BACKGROUND

Conversational interfaces are known in the art. For example, certain prior art mobile devices offer a conversational interface that allows the user to request information using a spoken, natural language command. In another area of prior art, customer service telephone systems often will allow a customer to request information from a server verbally over the phone or textually using a chat window or other device, again using natural language commands. These types of conversational interfaces involve a word recognition feature, where the words that were spoken or written by a person are determined, and an intent classification feature, where the meaning of the words and the intent of the person are determined. For instance, if a user says or writes "Tell me the weather," the receiving system needs to recognize which words were uttered, and then it needs to determine that the user was asking for information about the day's weather. After determining intent, the prior art systems obtain the requested information and provide it to the user, sometimes using synthesized speech.

These prior art conversational interfaces often rely on supervised machine learning models to perform various natural language understanding operations to determine intent. These models help classify a user's intent (e.g., what they want the system to do), as well as extracted entities (e.g., proper nouns) that make up the parameters a user wishes to perform an action against. These models rely heavily on understanding or capturing the vocabulary of the target domain to produce accurate predictions, and they typically require a library containing the entire vocabulary that might conceivably be uttered by a user.

The prior art lacks any conversational interfaces for use in cyber security environments. One reason for this is that closed-domains, such as cyber security, involve technical jargon and a nearly infinite number of proper nouns to capture (e.g., file names, MD5 hashes, IP address). For example, in a typical prior art cyber security environment, a user might type, "search process data for b58e841296be1e7a8c682622339e0cc4" to search for an MD5 hash against process data. A prior art intent classifier, if used in this context, would have difficulty predicting the correct label to use for "b58e841296be1e7a8c682622339e0cc4" because that term would not be in its vocabulary. Capturing highly diverse vocabularies highlight challenges in building performant classifiers. Attempting to capture this nomenclature in a single language model leads to extremely large models that do not generalize well outside the training environment. The resulting model fails to produce the performance (e.g. accuracy) required in a production setting and is often abandoned for a regex or direct matching solution.

What is needed is an improved conversational interface engine that is able to accurately determine a user's intent in a closed-domain environment where the user's utterance potentially could contain one or more instances of a near-infinite number of different terms.

BRIEF SUMMARY OF THE INVENTION

An improved system and method is disclosed for receiving a spoken or written utterance, identifying and replacing certain words within the utterance with labels to generate a simplified text string representing the utterance, performing intent classification based on the simplified text string, and performing an action based on the intent classification and the original words that were replaced.

BRIEF DESCRIPTION OF THE DRAWINGS

FIG. 4A depicts an exemplary utterance from a user.

FIG. 4B depicts a tokenized utterance.

FIG. 4D depicts named entity recognition.

FIG. 4F depicts tokenized redacted text.

DETAILED DESCRIPTION OF PREFERRED EMBODIMENTS

Figure 1:
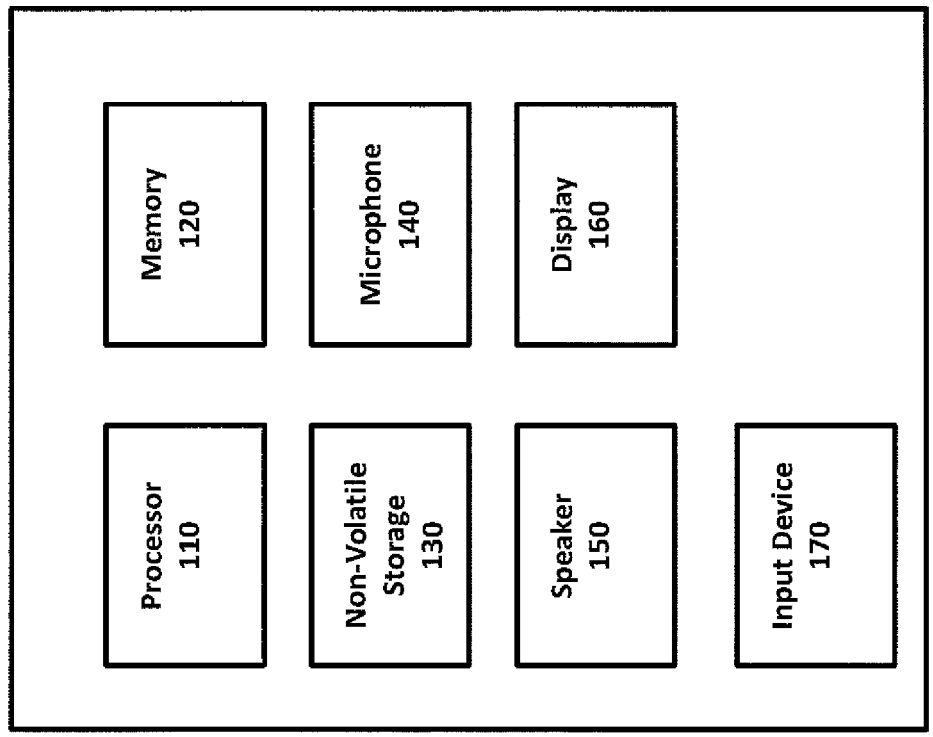
FIG. 1 depicts hardware components of a computing device.

With reference to FIG. 1, hardware components of computing device 100 are depicted. These hardware components are known in the prior art, and as to hardware, computing device 100 is a prior art device. Computing device 100 comprises processor 110, memory 120, non-volatile storage 130, microphone 140, speaker 150, display 160, and input device 170. Non-volatile storage 140 optionally is a hard disk drive or flash memory array. Input device 170 can include a keyboard, keypad, mouse, touchscreen, or other device for receiving input from a user. Computing device 100 can be a server, desktop computer, notebook computer, mobile device, or other type of device capable of implementing the embodiments described below.

Figure 2:
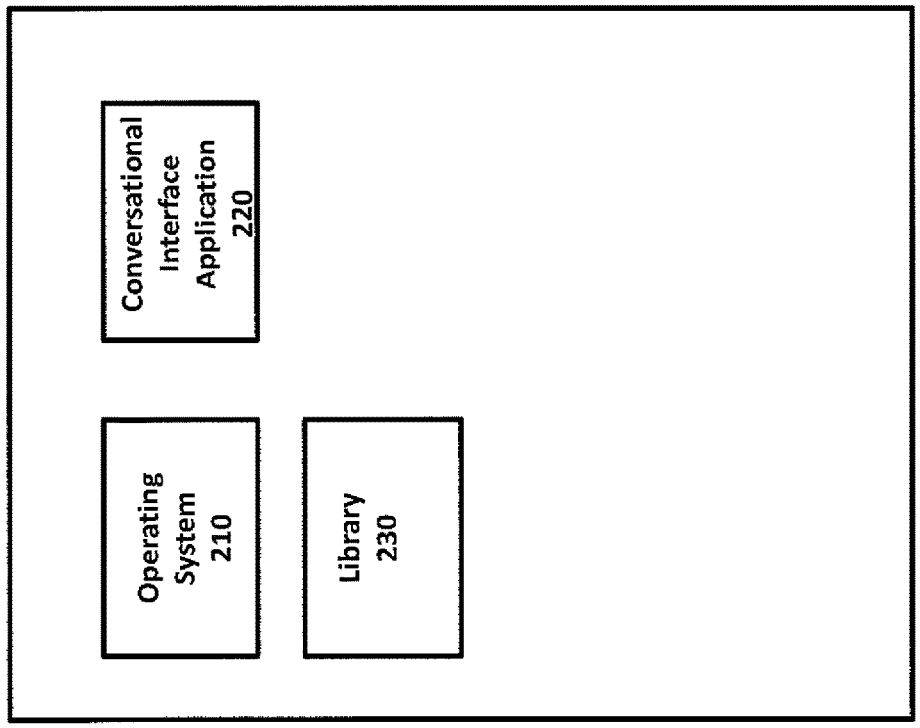
FIG. 2 depicts software components of a computing device.

With reference to FIG. 2, software components of computing device 100 are depicted. Computing device 100 comprises operating system 210 (such as the operating system known by the trademarks "Windows," "MacOS," "Android," or "iOS"), conversational interface application 220, and library 230. Conversational interface application 220 comprises lines of software code executed by processor 110 to perform the functions described below with reference to FIGS. 3 and 4. Conversational interface application 220 forms an important component of the inventive aspect of the embodiments described herein, and conversational interface application 220 is not known in the prior art.

An improved system and method will be described with reference to FIGS. 3 and 4.

Figure 3:
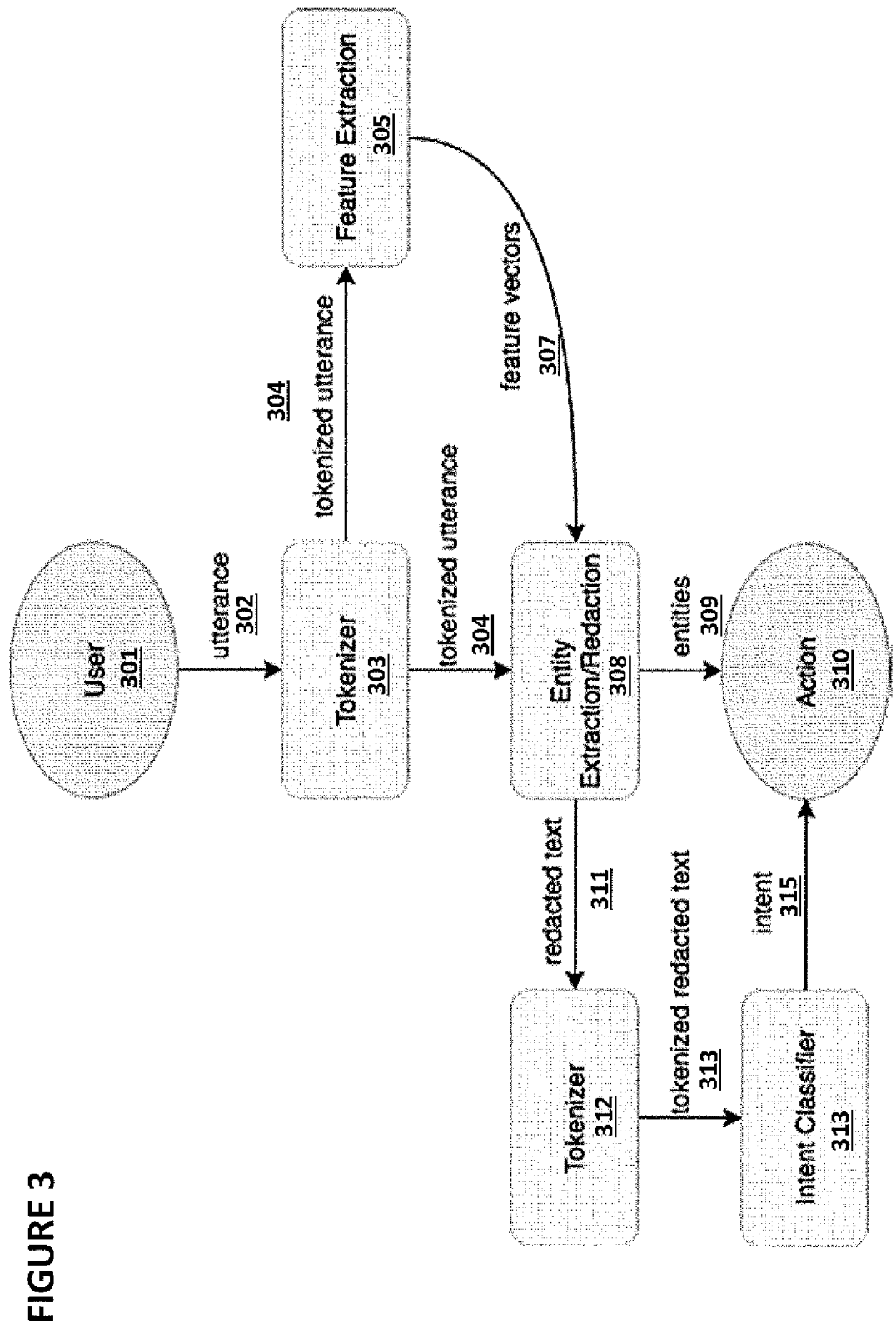
FIG. 3 depicts an embodiment of an intent classification method.

In FIGS. 3 and 4A, user 301 speaks or writes utterance 302: "Show processes for 1234123412341234 on Windows endpoints since Monday." Here, "1234123412341234" is an MD-5 hash value for a particular variable of interest. "Windows" refers to endpoints on the network that are running the Windows operating system, and "since Monday" provides a time period of interest. Prior art systems would have extreme difficulty in determining the user's intent as to "1234123412341234," because that MD-5 hash value is one of millions of possible values that could have been provided in utterance 302.

In FIGS. 3 and 4B, utterance 302 is analyzed by tokenizer 303 (which is an engine within conversational interface application 220), which generates tokenized utterance 304, where each individual word or term in utterance 302 is identified as a separate entity. This can be done, for example, by detecting silence between different words and by applying the grammar rules of the English language.

Figure 4C:
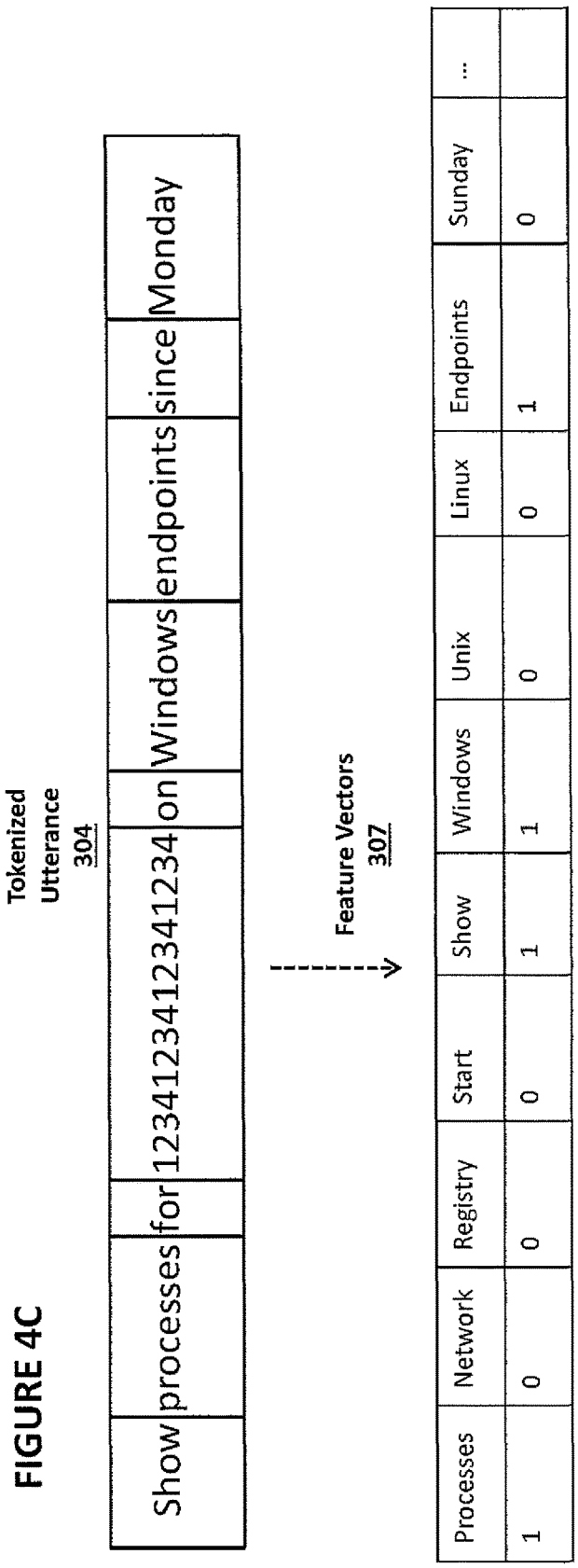
FIG. 4C depicts the generation of feature vectors based on the tokenized utterance.

In FIGS. 3 and 4C, feature extraction engine 305 (which is another engine within conversational interface application 220) analyzes tokenized utterance 304 and generates feature vectors 307 based on tokenized utterance 304. Feature extraction engine 305 uses methods such as TF-IDF, word embeddings and/or parts of speech tagging for each token within tokenized utterance 304. Feature vectors 307 comprise an array where each column represents one of the possible recurring terms that is expected to be received in an utterance, such as "processes," network," etc. Within each column, a value stored on a row indicates whether the term represented by that column is present in the tokenized utterance 304. Here, the term "processes, "show" "Windows," and "endpoints" are contained in tokenized utterance 304, and a "1" is placed in the second row for each of those columns. The other terms are not present, and a "0" is placed in the second row for those columns. Feature vectors 307 are sent to entity extraction/redaction engine 308 (which is another engine within conversational interface application 220).

Figure 4E:
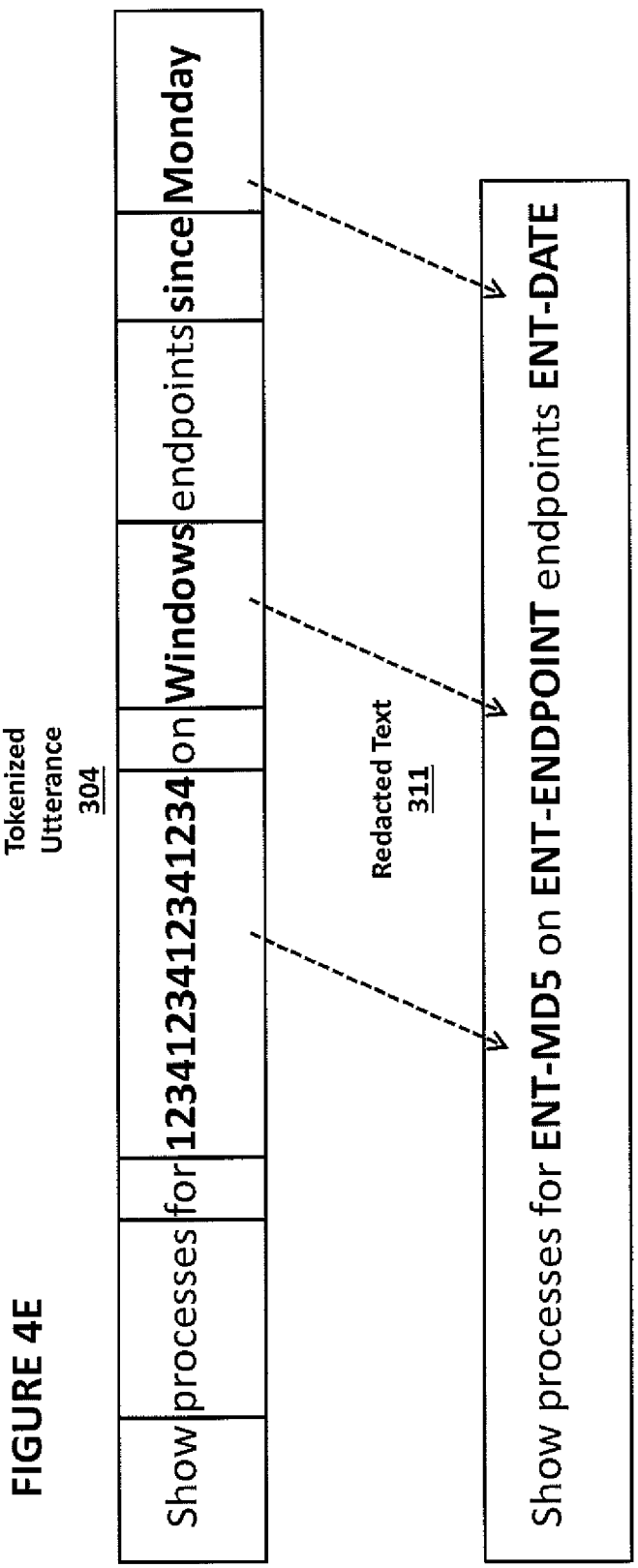
FIG. 4E depicts entity extraction and redaction.

In FIGS. 3 and 4D, entity extraction/redaction engine 308 analyzes tokenized utterance 304 and feature vectors 307 and identifies select terms that represent items that can be simplified. Feature vectors 307 are fed into a predictive sequence model which labels each token as an entity based on its feature vector, for example a Conditional Random Field (CRF) model or a Hidden Markov Model (HMM). Here, the terms "1234123412341234," "Windows," and "since Monday" are identified. Examples of the labels that can be used for select terms include the following:

Filename
MD5
SHA1
SHA256
Username
Domain name
IP address
Port
PID
Registry
Endpoint Operating System
Endpoint Hostname
Endpoint IP Address In FIGS. 3 and 4E, the select terms in tokenized utterance 304 are replaced with redacted text 311. In this example, the term "1234123412341234" is recognized as being an MD5 hash value, which can be discerned based on the number of digits, the fact that the term does not appear in an English-language dictionary, and its proximity to the word "processes." The term is replaced with the category "ENT-MD5." Similarly, "Windows" is replaced with "ENT-ENDPOINT," and "since Monday" is replaced with "ENT_DATE," resulting in redacted text 311.

In FIGS. 3 and 4F, redacted text 311 is then tokenized by tokenizer 312, resulting in tokenized redacted text 313.

Figure 4G:
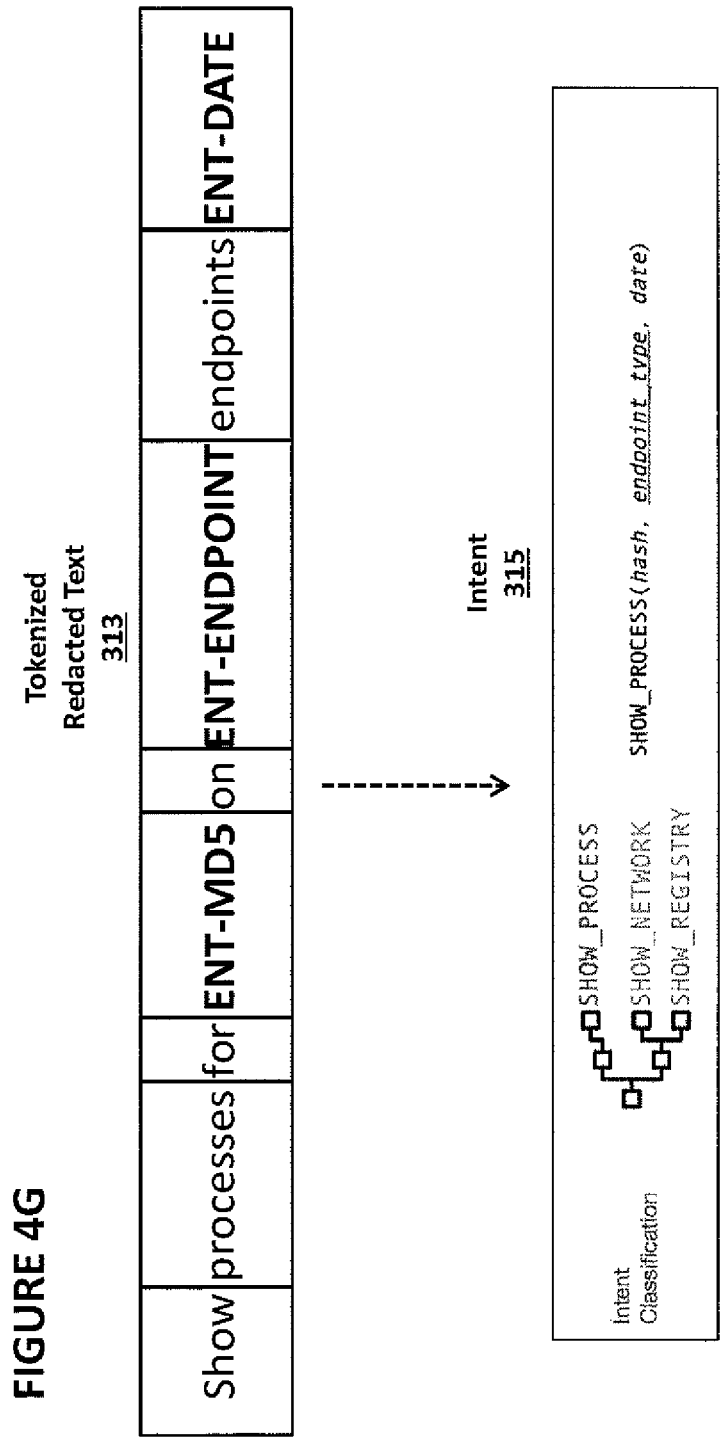
FIG. 4G depicts intent classification based on the tokenized redacted text.

In FIGS. 3 and 4G, tokenized redacted text 313 is analyzed by intent classifier 313 (which is another engine within conversational interface application 220) to determine the intent 315 of tokenized redacted text 313. The intent classifier 313 generates its own feature vectors per token and classifies the entire utterance using any number of supervised multi-class classifiers or multiple single class classifiers which 'vote' on the outcome. The fact that the redaction step has occurred makes the intent classification step much simpler and faster. Here, intent 315 indicates that the intent of utterance 302 was to issue the command "SHOW_PROCESS (hash, endpoint_type, date)".

Figure 4H:
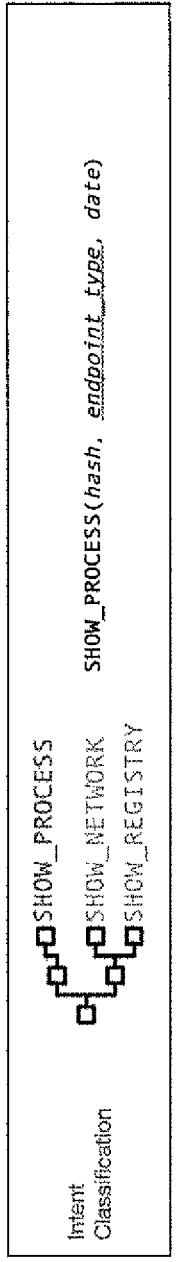
FIG. 4H depicts performing an action based on the intent classification.

In FIGS. 3 and 4H, once intent 315 is known, action 310 is performed, which simply executes the command that was intended by utterance 302, as if the command has been typed in by the user.

Figure 5A:
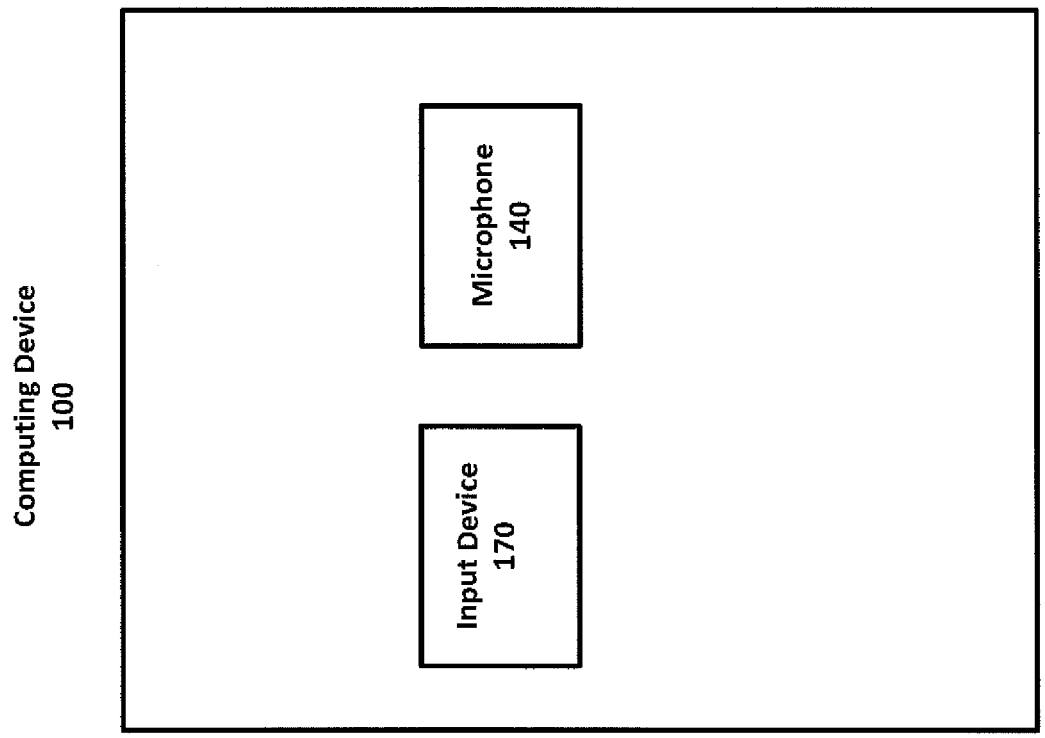
FIG. 5A depicts a user making an utterance to a computing device.
Figure 5A:
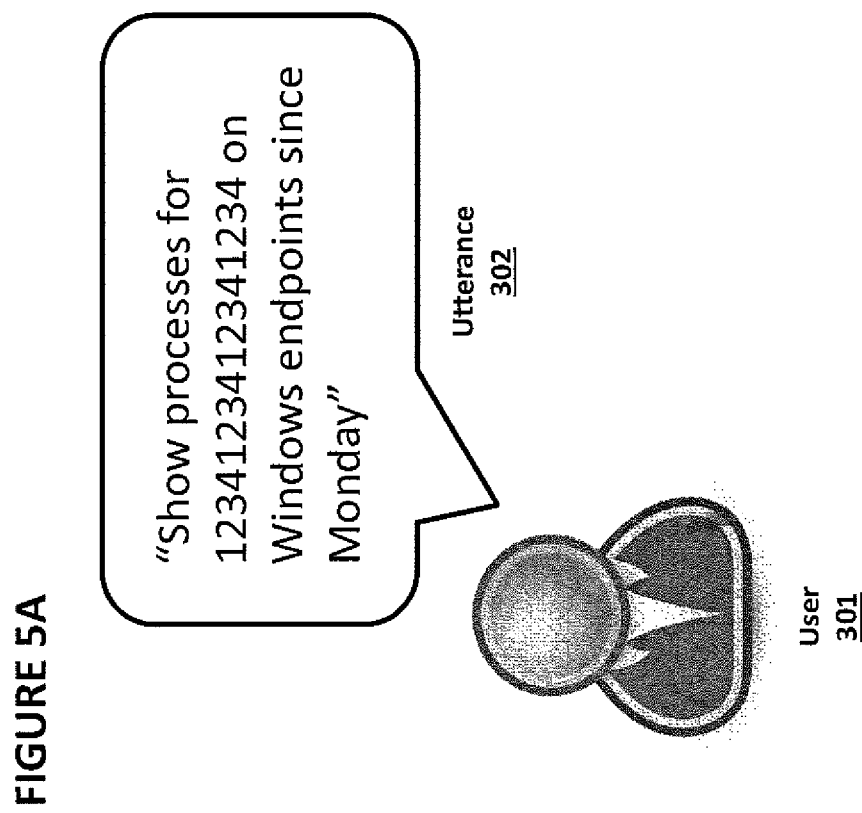
Figure 5B:
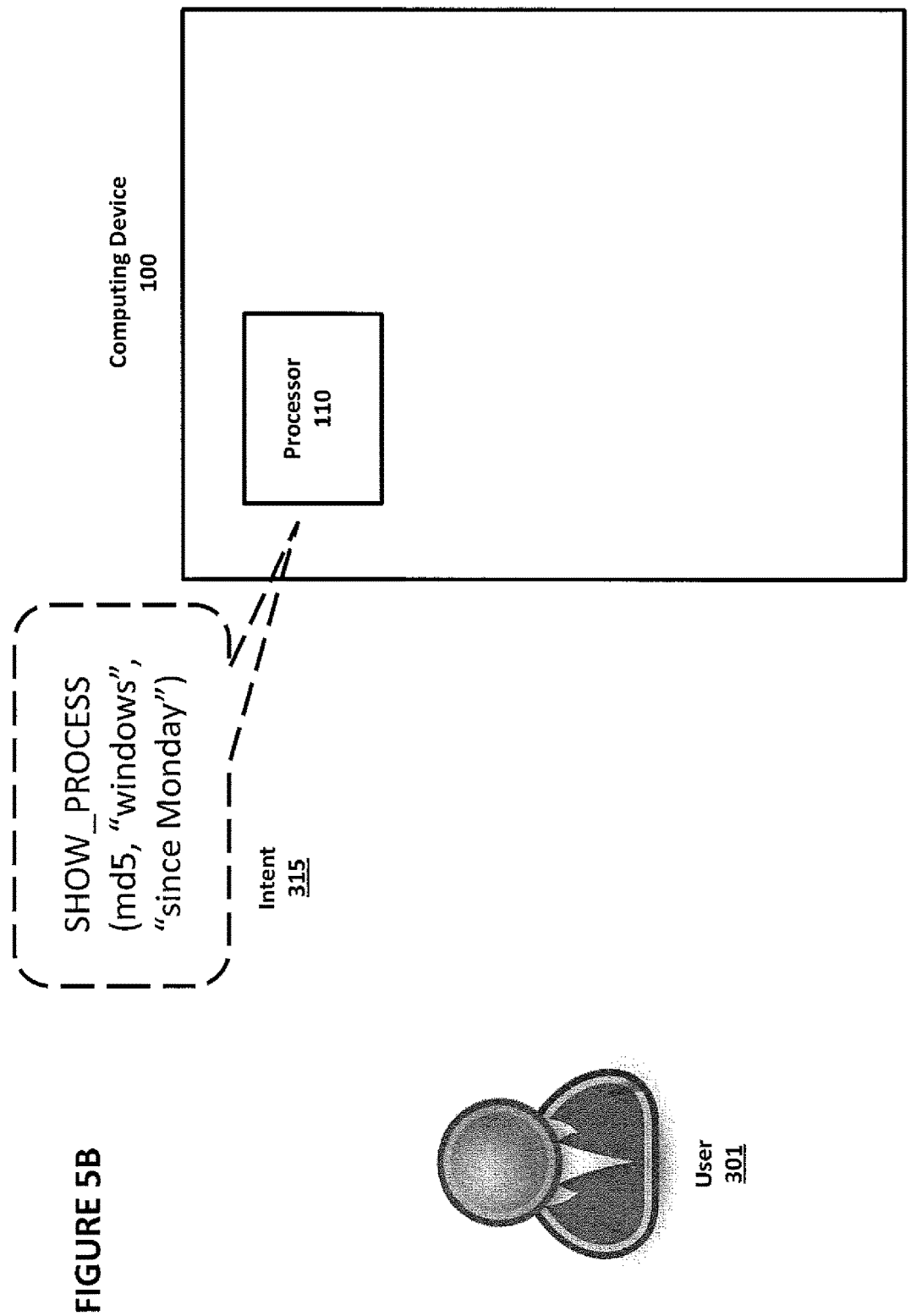
FIG. 5B depicts the computing device determining the intent of the utterance.
Figure 5C:
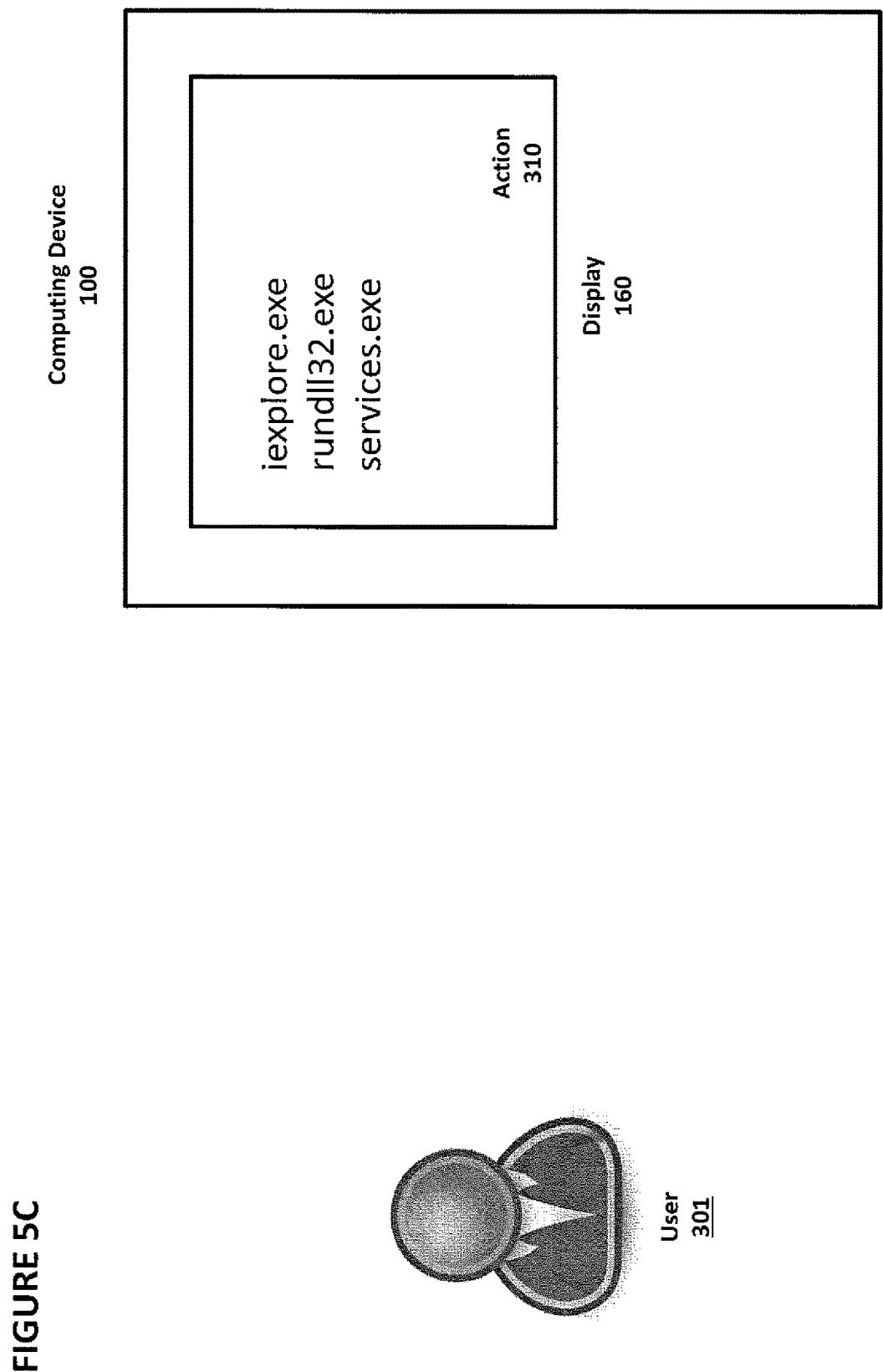
FIG. 5C depicts the computing device performing an action based on the intent of the utterance.

The embodiments are further illustrated in FIGS. 5A, 5B, and 5C. In FIG. 5A, user 301 speaks or writes the utterance 302, "Show processes for 1234123412341234 on Windows endpoints since Monday." This utterance is received by microphone 140 or input device 170 within computing device 100.

In FIG. 5B, computing device 100 performs the method described previously with reference to FIGS. 3 and 4, culminating in the determination of intent 315, "SHOW_ (hash, endpoint_type, date)".

Other examples of intent 315 within the context of cybersecurity include the following:

C2 Hunting
Cancel (clear conversation)
Greeting
Process Lineage
Search DNS
Search Network
Search Process
Search Powershell
Search User Login
Search Registry
Search File In FIG. 5C, computing device 100 performs an action 310 based on intent 315, which in this example is to display the processes that were executed by Windows endpoints since Monday.

It will be appreciated by one of ordinary skill in the art that the embodiment of FIGS. 3-5 provides an alternative to large vocabulary-based feature matrices by applying the entity extraction process prior to intent classification. This embodiment provides for an improved system that allows for the capture of a larger, more diverse vocabulary with a smaller, more performant model by replacing widely variable words and phrases with generic labels (e.g. 10.3.1.4 replaced with ENT-IP). This allows the model tasked with understanding the complete sentence to focus on the words signifying the user's intent not the specific parameters therein.

Since the intent determines much of the action to be taken, it is of vital importance to have accurate intent classification.

The training of the intent classifier engine 313 is made much simpler by only training on redacted text samples instead of the full panoply of text that the entity extractor must extract from. In turn, the accuracy of the intent classifier engine 313 is increased since it has a smaller more exact vocabulary to deal with.

Using the invention, one can reduce the set of characters representing a given concept down to our canonical concept prior to intent classification, which reduces the complexity of models downstream. Applicants have determined that using non-redacted sentences for training leads to an intent classifier model that is more than ten times the size on disk of a model trained on redacted versions of the same training sentences. This saves bandwidth during model updates, time during model loading, and memory when the model is loaded.

Applicants also have discovered a security and privacy benefit of the redaction process, as it provides anonymization of certain sensitive data, such as a customer's personal information. Collecting redacted customer queries via cloud export process would ensure the privacy of any customer queries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of providing a conversational interface for a computing device, the method comprising:
   receiving, by the computing device, an utterance from a user;
   tokenizing, by the computing device, the utterance into a tokenized utterance;
   generating, by the computing device, feature vectors for the tokenized utterance, the feature vectors comprising a plurality of terms and a value for each of the plurality of terms indicating the presence of each of the plurality of terms in the tokenized utterance;
   identifying, by the computing device using the tokenized utterance and the feature vectors, select terms in the tokenized utterance to replace with labels;
   replacing, by the computing device, the select terms with labels to generate redacted text;
   tokenizing, by the computing device, the redacted text into tokenized redacted text;
   determining, by the computing device, an intent of the utterance using the tokenized redacted text;
   performing, by the computing device, an action based on the intent.

2. The method of claim 1, wherein the select terms comprise an MD-5 hash value.

3. The method of claim 1, wherein the select terms comprise an IP address.

4. The method of claim 1, wherein the select terms comprise a filename.

5. The method of claim 1, wherein the select terms comprise a user name.

6. The method of claim 1, wherein the select terms comprise a domain name.

7. The method of claim 1, wherein the select terms comprise a port.

8. The method of claim 1, wherein the select terms comprise an endpoint operating system.

9. The method of claim 1, wherein the select terms comprise an endpoint host name.

10. The method of claim 1, wherein the select terms comprise an endpoint IP address.

11. The method of claim 1, wherein the utterance is a voice utterance.

12. The method of claim 1, wherein the utterance is a written utterance.

13. A computing device comprising a processor, memory, and non-volatile storage, the non-volatile storage containing a computer program comprising instructions for performing the following steps when executed by the processor:
    receiving an utterance from a user;
    tokenizing the utterance into a tokenized utterance;
    generating feature vectors for the tokenized utterance, the feature vectors comprising a plurality of terms and a value for each of the plurality of terms indicating the presence of each of the plurality of terms in the tokenized utterance;
    identifying, using the tokenized utterance and the feature vectors, select terms in the tokenized utterance to replace with labels;
    replacing the select terms with labels to generate redacted text;
    tokenizing the redacted text into tokenized redacted text;
    determining an intent of the utterance using the tokenized redacted text;
    performing, by the computing device, an action based on the intent.

14. The device of claim 13, wherein the select terms comprise an MD-5 hash value.

15. The device of claim 13, wherein the select terms comprise an IP address.

16. The device of claim 13, wherein the select terms comprise a filename.

17. The device of claim 13, wherein the select terms comprise a user name.

18. The device of claim 13, wherein the select terms comprise a domain name.

19. The device of claim 13, wherein the select terms comprise a port.

20. The device of claim 13, wherein the select terms comprise an endpoint operating device.

21. The device of claim 13, wherein the select terms comprise an endpoint host name.

22. The device of claim 13, wherein the select terms comprise an endpoint IP address.

23. The device of claim 13, wherein the utterance is a voice utterance.

24. The device of claim 13, wherein the utterance is a written utterance.

\* \* \* \* \*